April 12, 1949.　　B. L. BINFORD　　2,467,073
MAGNETIC CONTROL MECHANISM
Filed Sept. 16, 1944
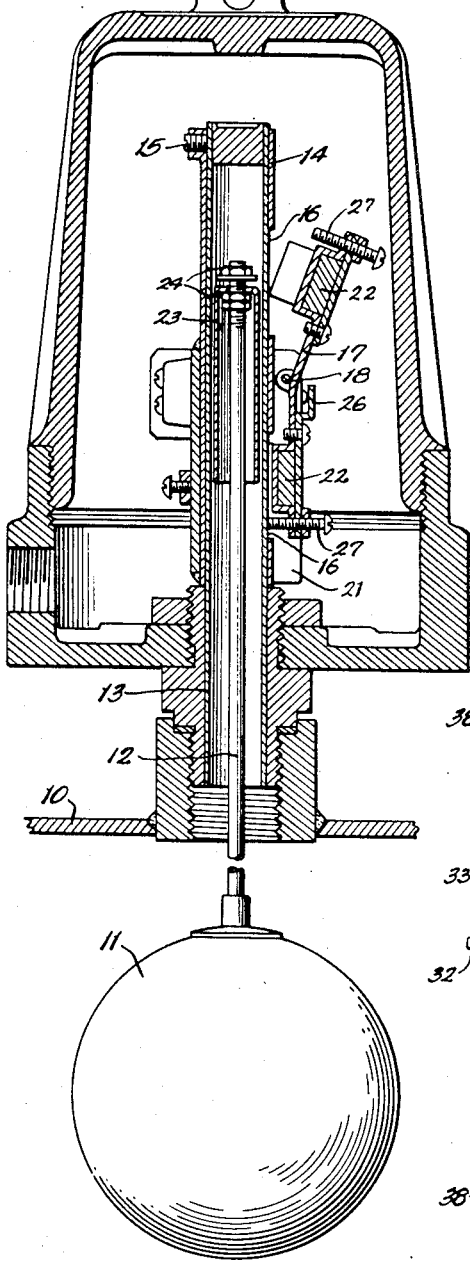
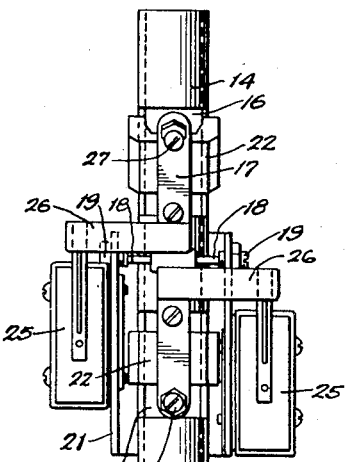
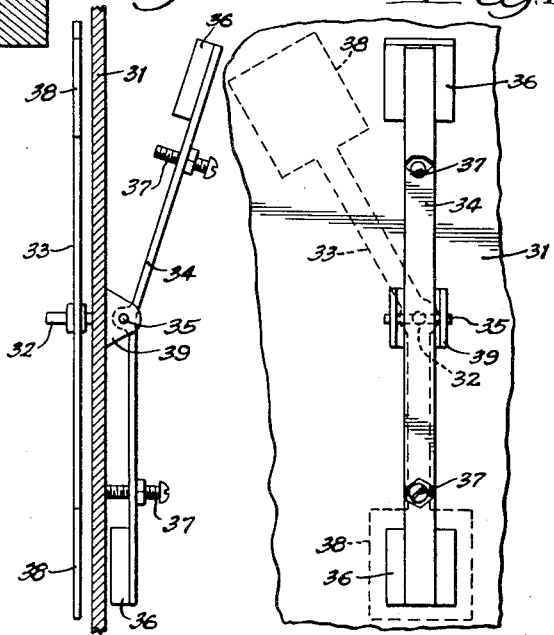
Inventor:
Benjamin L. Binford,
By Dawson, Ooms and Booth
Attorneys.

Patented Apr. 12, 1949

2,467,073

UNITED STATES PATENT OFFICE 2,467,073

MAGNETIC CONTROL MECHANISM

Benjamin L. Binford, Chicago, Ill., assignor to Magnetrol, Inc., Chicago, Ill., a corporation of Illinois Application September 16, 1944, Serial No. 554,518

7 Claims. (Cl. 200—87)

This invention relates to magnetic control mechanism and more particularly to a magnetically actuated mechanism for performing a control function.

Magnetically operated control mechanisms have heretofore been proposed as shown, for example, in the patent to Moore No. 2,292,648. While such mechanisms are very efficient and satisfactory under most conditions of use, they are sometimes affected when subjected to large amplitude vibrations or to pitching or rolling movements such as occur on ships. Movements of this character may cause undesired operation of the mechanism or may prevent it from operating when desired.

One of the objects of the present invention is to provide a magnetic control mechanism which is extremely stable even under conditions of vibration or other movements.

Another object of the invention is to provide magnetic control mechanism in which a tilting member is moved by magnetic forces simultaneously effective at both ends of the member. According to one feature of the invention the magnetic forces at the ends of the tilting member are varied inversely to each other to cause tilting of the member in one direction or another.

Still another object of the invention is to provide magnetic control mechanism which can be manufactured as a unit and easily installed at a desired point of use.

The above and other objects and advantages of the invention will be more readily apparent from the following description when read in connection with the accompanying drawing, in which—

Figure 1 is a sectional view of a liquid level control apparatus embodying the invention;

Figure 2 is a side elevation of the control unit of Figure 1;

Figure 3 is a section with parts in elevation of an alternative construction; and Figure 4 is an elevation of the mechanism of Figure 3.

The mechanism of Figure 1 is particularly adapted to maintain a desired liquid level in a tank such as a boiler, a chemical process or treating tank or the like. The liquid in the tank whose top is indicated at 10 supports and moves a float 11 having a stem 12 projecting vertically into a tube 13. The tube 13 is sealed to the tank at its lower open end, is closed at its upper end and is formed of a non-magnetic material such as brass or plastic.

A control unit is mounted on the tube and, as shown, comprises a tubular support 14 adapted to fit over the tube 13 and secured in place thereon by a set screw 15. The support 14 is preferably cut out at spaced points 16 to expose the tube 13. The support carries an elongated lever 17 pivoted intermediate its ends on a pivot 18 transverse to the axis of the tube and the support. As shown the pivot 18 is carried by adjustable screws 19 threaded into the sides of a U-shaped bracket 21 whose base may be welded or otherwise secured to the support 14.

The lever 17 is adapted to be tilted about its pivot 18 in response to movement of the float 11 and for this purpose is magnetically coupled to a member moved by the float. As shown, the lever carries small permanent magnets 22 adjacent its ends which are movable toward and away from the openings 16 in the support as the lever tilts. The magnets 22 cooperate with an armature in the form of a sleeve 23 of magnetic material which is moved axially in the tube 13 by the float 11. As shown, the sleeve 23 is movable on the float stem 12 between spaced stop nuts 24 to provide a lost motion connection. The sleeve 23 is of a length greater than the distance between the closest parts of the magnets 22 so that its end portions which function as armatures may be in the fields of both magnets 22 simultaneously.

The lever 17 is adapted to operate control means which may control the liquid level in the tank or any other desired apparatus in accordance with variations in the liquid level. As illustrated, the control means comprises two micro switches 25 mounted on the bracket 21. The switches are operated by arms 26 carried by and projecting from the lever 17 to engage operating levers or buttons on the switches. While two switches are shown by way of example, it will be understood that any desired number could be employed depending upon the control operation to be performed.

In operation with the parts shown in the position of Figure 1, the magnetic tube 23 lies opposite the lower magnet 22 which is attracted thereby to a position adjacent the tube 13. Movement of the lower magnet 22 toward the tube may be limited by a stop screw 27, a similar stop screw 27 being provided at the opposite end of the lever 17 to limit movement of the upper magnet toward the tube. In this position of the lever 17 the lowermost one of the switches 25 will be held closed and may operate, for example, to supply liquid to the tank to raise the level therein.

As the liquid level rises the sleeve 23 will be moved upwardly in the tube 13. Since the sleeve 23 is longer than the distance between the adjacent sides of the magnet, its upper end will be moved into the field of the upper magnet 22 before its lower end is moved out of the field of the lower magnet. However, since the air-gap between the lower magnet and the sleeve is substantially less than the gap between the upper magnet and the sleeve, the lever 17 will be held in the position shown by the lower magnet until the center of the sleeve 23 is above the level of the pivot 18. When this occurs, the attraction of the upper magnet will exceed that of the lower magnet and the lever 17 will tilt counterclockwise to open the lower switch 25 and close the upper switch 26. The upper switch may operate to shut off the liquid supply to prevent the level in the tank from rising any higher.

Due to the lost motion connection between the stem 12 and the sleeve 23, the sleeve may be pulled upwardly in the tube 13 by the action of the upper magnet 22. As the float 11 begins to descend the sleeve 23 will be held in its upper position by the operation of the magnet until the upper stop screw 24 engages it and moves it downwardly. By adjusting the stop screws 24 any desired amount of lost motion travel of the float relative to the sleeve may be provided to provide the desired variation in liquid level between reversals of position of the lever 17.

It will be noted that the lever 17 is pivoted at its center and is balanced about its pivotal axis so that it is relatively unaffected by vibration or bodily motion. The only movement tending to tilt the lever 17 is an angular acceleration about the pivotal axis 18 which is not apt to occur to any great extent. Furthermore, since the lever is always held in the position it occupies by a magnetic force, it is extremely stable and may be used satisfactorily in locations which are subject to large amplitude vibrations or other movements.

Figures 3 and 4 illustrate an alternative construction for mounting directly on a tank or the like whose wall indicated at 31 is of non-magnetic material such as brass. On one side of the wall, preferably the interior, a pivot 32 is provided extending at right angles from the wall and supporting an elongated lever 33. The lever 33 is mounted intermediate its ends and its end portions are arranged at an obtuse angle to each other as shown. The lever 33 may be connected to a float or like operating mechanism for turning it in accordance with variations in a condition to be controlled.

On the opposite side of the wall a lever 34 is pivoted intermediate its ends on a pivot 35 supported between brackets 39. The axes of the pivots 32 and 35 intersect at a right angle as shown. The lever 34 carries magnets 36 at its ends and is preferably provided with stop screws 37 to limit movement of its ends toward the wall 31.

In order to control the lever 34 in accordance with movements of the lever 33 enlarged magnetic armature portions 38 are provided at the ends of the lever 33. The armature portions 38 are of such circumferential length relative to the angle of the opposite ends of lever 33, that one of the armature portions will move into the field of the corresponding magnet 36 before the other armature portion moves out of the field of its corresponding magnet.

In operation with parts in the position shown, the lower armature 38 underlies the lower magnet 36 and the upper armature is out of register with the upper magnet. The lower magnet will, therefore, be moved toward the wall 31 tilting the lever 34 clockwise to operate switches or other control means (not shown). As the lever 33 turns clockwise, the lower armature starts to move away from the lower magnet and the upper armature moves into the field of the upper magnet. After the lever 33 has turned to a position in which the upper armature lies more in the field of the upper magnet than the lower armature in the field of the lower magnet, the lever 34 will be tilted about the pivot 35. In this construction as in the construction of Figures 1 and 2, one of the armatures is always in the field of its magnet so that the lever 34 is stabilized and will not be affected by vibrations or other movements.

While two embodiments of the invention have been shown and described in detail herein, it will be understood that these are illustrative only and are not intended as definitions of the scope of the invention, reference being had for this purpose to the appended claims.

What is claimed is:

1. Magnetic control mechanism comprising a non-magnetic support, an elongated member pivoted intermediate its ends on the support, a second elongated member movable relative to the first member, individual spaced magnets carried by the ends of one of the members, the other of the members having its end portions formed of magnetic material to provide armatures for the magnets, and the other of the members being longer than the distance between the closest parts of the magnets and shorter than the distance between the most widely spaced parts of the magnets so that when the second member moves relative to the first named member one of the armatures will move partially into the field of one of the magnets before the other armature moves completely out of the field of the other magnet.

2. Magnetic control mechanism comprising a wall formed of relatively thin non-magnetic material, an elongated member pivoted intermediate its ends on an axis generally parallel to the wall on one side thereof for movement of its ends toward and away from the wall, a second elongated member movable relative to the first member on the other side of the wall, individual spaced magnets carried by the ends of one of the members, the other of the members having its end portions formed of magnetic material to provide armatures for the magnets, and the other of the members being longer than the distance between the closest parts of the magnets and shorter than the distance between the most widely spaced parts of the magnets so that one of the armatures moves partially into the field of one of the magnets before the other armature moves completely out of the field of the other magnet.

3. Magnetic control mechanism comprising a wall formed of relatively thin non-magnetic material, an elongated member pivoted intermediate its ends on an axis generally parallel to the wall on one side thereof for movement of its ends toward and away from the wall, a second elongated member pivoted on the other side of the wall on an axis at right angles to the axis of the first named member, magnets carried by the ends of one of the members, the ends of the other member being of magnetic material to provide armatures for the magnets, the circumferential length and spacing of the armatures being such that one armature enters the field of one of the magnets before the other armature leaves the field of the other magnet.

4. Magnetic control mechanism comprising a tube of non-magnetic material, an elongated member pivoted on the exterior of the tube on an axis transverse to the axis of the tube, a second elongated member slidable axially on the inside of the tube, magnets carried by the ends of one of the members, the end portions of the other member forming magnetic armatures for the magnets, and said other member being longer than the distance between the closest parts of the magnets and shorter than the distance between the most widely spaced parts of the magnets so that its end portions may simultaneously lie in the fields of both magnets.

5. Magnetic control mechanism comprising a tube of non-magnetic material, an elongated member pivoted on the exterior of the tube on an axis transverse to the axis of the tube, a second elongated member slidable axially on the inside of the tube, magnets carried by the ends of the first member, the second member being of magnetic material and of a length greater than the distance between the closest part of the magnets and less than the distance between the most widely spaced parts of the magnets whereby the second member may lie partially in the fields of both magnets simultaneously.

6. Magnetic control mechanism comprising a non-magnetic support, an elongated member pivoted intermediate its ends on the support, a second elongated member movable relative to the first member in a plane parallel to the pivotal axis of the first member, individual spaced magnets carried by the ends of one of the members, the other of the members having its ends formed of magnetic material to provide armatures for the magnets, the distance between the outer portions of the armatures measured along the path of movement of the second elongated member being greater than the distance between the closest parts of the magnets measured along said path and less than the distance between the most widely spaced parts of the magnets measured along said path so that when the second member moves relative to the first named member one of the armatures will move partially into the field of one of the magnets before the other armature moves completely out of the field of the other magnet.

7. Magnetic control mechanism comprising a non-magnetic support; an elongated member pivoted intermediate its ends on the support for movement of its ends toward and away from the support, individual spaced magnets carried by the ends of said member, a second elongated member movable relative to the first member in a plane parallel to the pivotal axis of the first member and having its ends formed of magnetic material to provide armatures for the magnets, the centers of the armatures traveling along a predetermined path as the second member moves, the distance between the outer edges of the armatures measured along said path being greater than the distance between the closest parts of the magnets measured along said path and less than the distance between the most widely spaced parts of the magnets measured along said path so that when the second member moves relative to the first named member one of the armatures will move partially into the field of one of the magnets before the other armature moves completely out of the field of the other magnet.

BENJAMIN L. BINFORD.

REFERENCES CITED

The following references are of record in the file of this patent:

UNITED STATES PATENTS

| Number | Name | Date |
|---|---|---|
| 355,815 | Ghegan | Jan. 11, 1887 |
| 1,561,232 | Higbee | Nov. 10, 1925 |
| 1,834,934 | Brach | Dec. 8, 1931 |
| 2,044,152 | Clancy | June 16, 1936 |
| 2,292,648 | Moore | Aug. 11, 1942 |